(12) United States Patent
Bobroff et al.

(10) Patent No.: US 9,619,378 B2
(45) Date of Patent: Apr. 11, 2017

(54) DYNAMICALLY OPTIMIZING MEMORY ALLOCATION ACROSS VIRTUAL MACHINES

(71) Applicant: GLOBALFOUNDRIES Inc., Grand Cayman (KY)

(72) Inventors: Norman Bobroff, Yorktown Heights, NY (US); Arun Kwangil Iyengar, Yorktown Heights, NY (US); Peter Hans Westerink, Yorktown Heights, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 328 days.

(21) Appl. No.: 13/918,672

(22) Filed: Jun. 14, 2013

(65) Prior Publication Data

US 2014/0372723 A1    Dec. 18, 2014

(51) Int. Cl.
```
G06F 12/00     (2006.01)
G06F 12/02     (2006.01)
G06F 11/34     (2006.01)
G06F 3/06      (2006.01)
G06F 9/50      (2006.01)
G06F 17/30     (2006.01)
G06F 13/28     (2006.01)
```
(52) U.S. Cl.
CPC ............ *G06F 12/023* (2013.01); *G06F 11/34* (2013.01); *G06F 3/0604* (2013.01); *G06F 3/0631* (2013.01); *G06F 9/5011* (2013.01); *G06F 9/5016* (2013.01); *G06F 13/28* (2013.01); *G06F 17/302* (2013.01); *G06F 2212/1016* (2013.01); *G06F 2212/1044* (2013.01); *G06F 2212/152* (2013.01)

(58) Field of Classification Search
CPC ...... G06F 9/5016; G06F 13/28; G06F 17/302; G06F 3/0604; G06F 3/0631; G06F 9/5011; G06F 11/34; G06F 12/023; G06F 2212/1016; G06F 2212/1044; G06F 2212/152
USPC .................................................. 711/170, 171
See application file for complete search history.

(56) References Cited

U.S. PATENT DOCUMENTS

```
8,190,843 B1 *  5/2012  de Forest ............... G06F 13/28
                                                711/154
2008/0307188 A1 * 12/2008 Franaszek ............. G06F 9/5016
                                                711/171
```

OTHER PUBLICATIONS

Gupta, et al., "Difference Engine: Harnessing Memory Redundancy in Virtual Machines", Proceedings of OSDI 2008 http://cseweb.ucsd.edu/~vahdat/papers/osdi08-de.pdf.
(Continued)

*Primary Examiner* — Mardochee Chery
(74) *Attorney, Agent, or Firm* — David Cain; Andrew M. Calderon; Roberts Mlotkowski Safran Cole & Calderon P.C.

(57) ABSTRACT

A method for allocating memory among a plurality of computing systems includes assigning a free memory threshold to each computing system, dynamically varying at least one free memory threshold for at least one computing system based on a past memory usage of the at least one computing system, periodically monitoring each computing system for memory usage and in response to the monitoring determining that an amount of free memory for the computer system is below the free memory threshold for the computing system, allocating memory from the free memory pool to the computing system.

39 Claims, 7 Drawing Sheets

(56) References Cited

OTHER PUBLICATIONS

Understanding Memory Resource Management in VMWARE ESX 4.1", VMWARE Performance Study http://www.vmware.com/files/pdf/techpaper/vsp_41_perf_memory_mgmt.pdf.
Active Memory Expansion: Overview and Usage Guide, D. Hepkin, IBM white paper, Feb. 9, 2010 http://public.dhe.ibm.com/common/ssi/ecm/en/pow03037usen/POW03037USEN.PDF.
R. Ceron, et al, "Power Systems Memory Deduplication", IBM Corporation, Feb. 2012 http://www.redbooks.ibm.com/redpapers/pdfs/redp4827.pdf.
A. Brito et al, IBM PowerVM Virtualization Active Memory Sharing, IBM Corporation, Jun. 2011 http://www.redbooks.ibm.com/redpapers/pdfs/redp4470.pdf.
http://en.wikipedia.org/wiki/Dynamic_Logical_Partitioning, Downloaded on Jun. 14, 2013.
http://www.ibmsystemsmag.com/aix/administrator/1par/AIX-Extra--Using-Dynamic-LPAR-in-AIX-5L-v5-2/ Downloaded on Jun. 14, 2013.
http://en.wikipedia.org/wiki/Comparison_of_platform_virtual_machines Downloaded on Jun. 14, 2013.

* cited by examiner

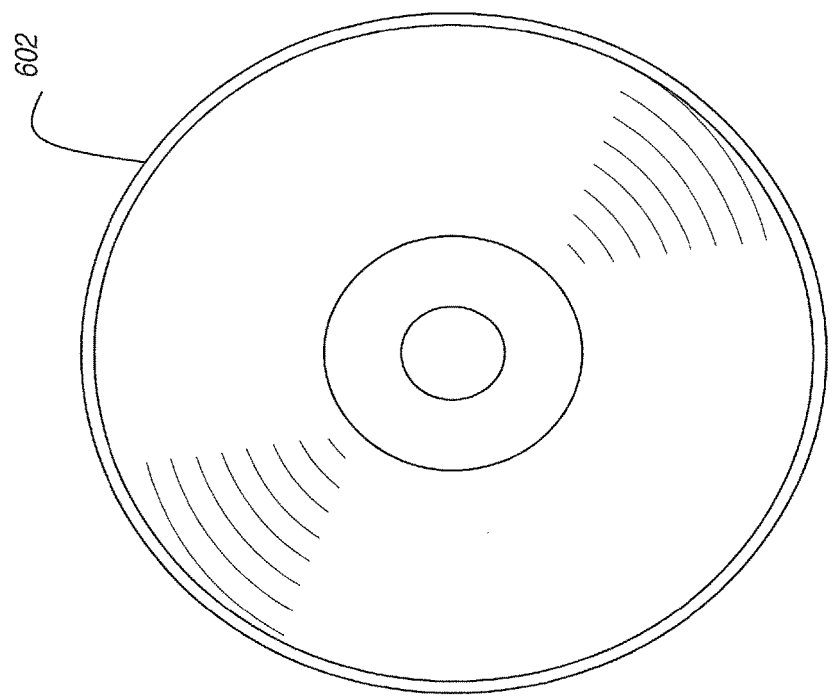
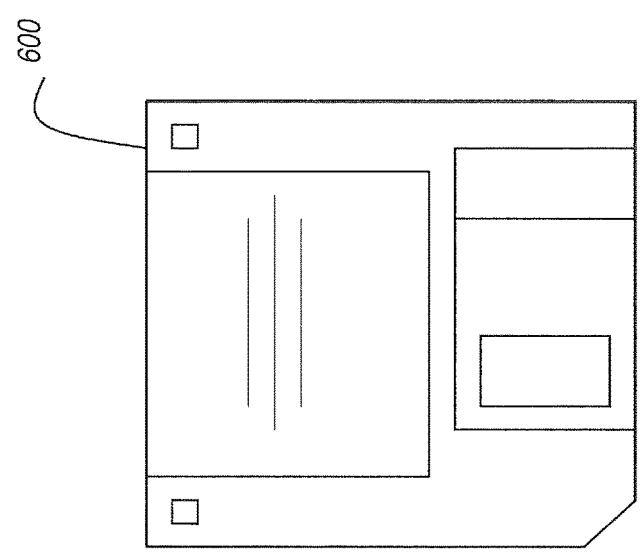
FIG. 6

DYNAMICALLY OPTIMIZING MEMORY ALLOCATION ACROSS VIRTUAL MACHINES

BACKGROUND OF THE INVENTION

Field of the Invention

The present invention generally relates to a method and system for optimizing memory allocation, and more particularly to a method and system for dynamically allocating memory among a plurality of computing systems.

Description of the Related Art

The ability to move memory between different virtual machines is critically important for improving performance. Having this capability can prevent memory overload which could cause a system to crash or become unusable. This capability also allows more virtual machines to be packed onto the same hardware, which can significantly increase the workload which can be handled by the same hardware.

Past approaches to this problem are insufficient to react to memory overload situations quickly enough. Past techniques include memory deduplication (active memory deduplication in AIX® and transparent page sharing in VMware®) and delta encoding, ballooning, IBM®'s Active Memory Sharing®, and memory compression.

Virtual machines (VMs) may be implemented in multiple ways including but not limited to IBM's Dynamic Logical Partitioning (DLPAR), VMware virtualization platforms such as ESX®, Xen®, KVM®, Java® virtual machines, etc.

SUMMARY OF THE INVENTION

In view of the foregoing and other exemplary problems, drawbacks, and disadvantages of the conventional methods and structures, an exemplary feature of the present invention is to provide methods, structures and programs for dynamically allocating memory.

A first exemplary aspect of the present invention includes a method for allocating memory among a plurality of computing systems. The method includes assigning a free memory threshold to each computing system, dynamically varying at least one free memory threshold for at least one computing system based on a past memory usage of the at least one computing system, periodically monitoring each computing system for memory usage and in response to the monitoring determining that an amount of free memory for the computer system is below the free memory threshold for the computing system, and allocating memory from the free memory pool to the computing system.

Another exemplary of the present invention includes a method for allocating memory among a plurality of computing systems. The method includes assigning a free memory threshold to each computing system wherein at least one free memory threshold assigned to a computing system is determined so that one of a probability of the computing system achieving paging does not exceed a threshold and a probability of the plurality of computing systems achieving paging, does not exceed a threshold, periodically monitoring each computing system for memory usage and in response to the monitoring determining that an amount of free memory for the computing system is below the free memory threshold for the computing system, and allocating memory from the free memory pool to the computing system.

Yet another exemplary aspect of the claimed invention includes a method for allocating memory among a plurality of computing systems. The method includes periodically monitoring each computing system for memory usage, in response to said monitoring determining that a computing system is running low on free memory, determining if a memory size of the computing system has recently increased, and, in response to one of determining that the memory size of the computing system has not recently increased and the memory size of the computing system has increased at a rate falling below a threshold, allocating memory from the free memory pool to the computing system.

Still another exemplary aspect of the claimed invention includes a method for allocating memory among a plurality of computing systems. The method including assigning a free memory pool size threshold to a free memory pool, memory from the free memory pool can be allocated to a plurality of the computing systems, dynamically varying the free memory pool size threshold in response to changing memory demands, periodically monitoring each computing system and the free memory pool for memory usage, in response to said monitoring determining that a computer system is running low on free memory, allocating memory from the free memory pool to the computer system and, in response to determining that a size of the free memory pool is below the free memory pool size threshold, identifying at least one computing system with sufficient free memory and transferring memory from said at least one computing system to the free memory pool.

Still another exemplary aspect of the claimed invention includes a method for allocating memory among a plurality of computing systems. The method includes, assigning a free memory pool size threshold to a free memory pool, the free memory pool size threshold determined so that a probability of the free memory pool running out of memory does not exceed a threshold, periodically monitoring each computing system and the free memory pool for memory usage, in response to said monitoring determining that a computing system is running low on free memory, allocating memory from the free memory pool to the computer system, in response to determining that a size of the free memory pool is below the free memory pool size threshold, identifying at least one computing system with sufficient free memory and transferring memory from said at least one computing system to the free memory pool.

Yet another exemplary aspect of the claimed invention includes a method for allocating memory among a plurality of computing systems. The method includes periodically monitoring each computing system and the free memory pool for memory usage, in response to said monitoring determining that a computing system is running low on free memory, allocating memory from the free memory pool to the computer system, in response to said monitoring determining that the free memory pool is running low on free memory, determining if a size of the free memory pool has recently increased, in response to determining that the size of the free memory pool has not recently increased, identifying at least one computing system with sufficient free memory and transferring memory from said at least one computing system to the free memory pool.

Still another exemplary aspect of the present invention includes a non-transitory computer-readable storage medium tangibility embodying a program of machine-readable instructions executable by a digital processing apparatus to perform at least any of the above methods.

Still another exemplary aspect of the present invention includes a computer program product for dynamically varying memory. The computer program product including a computer readable storage medium having computer readable program code embodied therewith, the computer readable program code comprising including computer readable program code configured to perform at least any of the above methods.

Still another exemplary aspect of the present invention includes a system for dynamic memory allocation within a plurality of computing systems. The system includes a monitor for periodically monitoring one or more memory components and a memory rebalancer for distributing memory equitably among said one or more memory components.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 6 is a description of exemplary storage media 600, 602 which may be used in conjunction with the typical hardware configuration of FIG. 5 and also with the exemplary architecture of any other figures.

Figure 1:
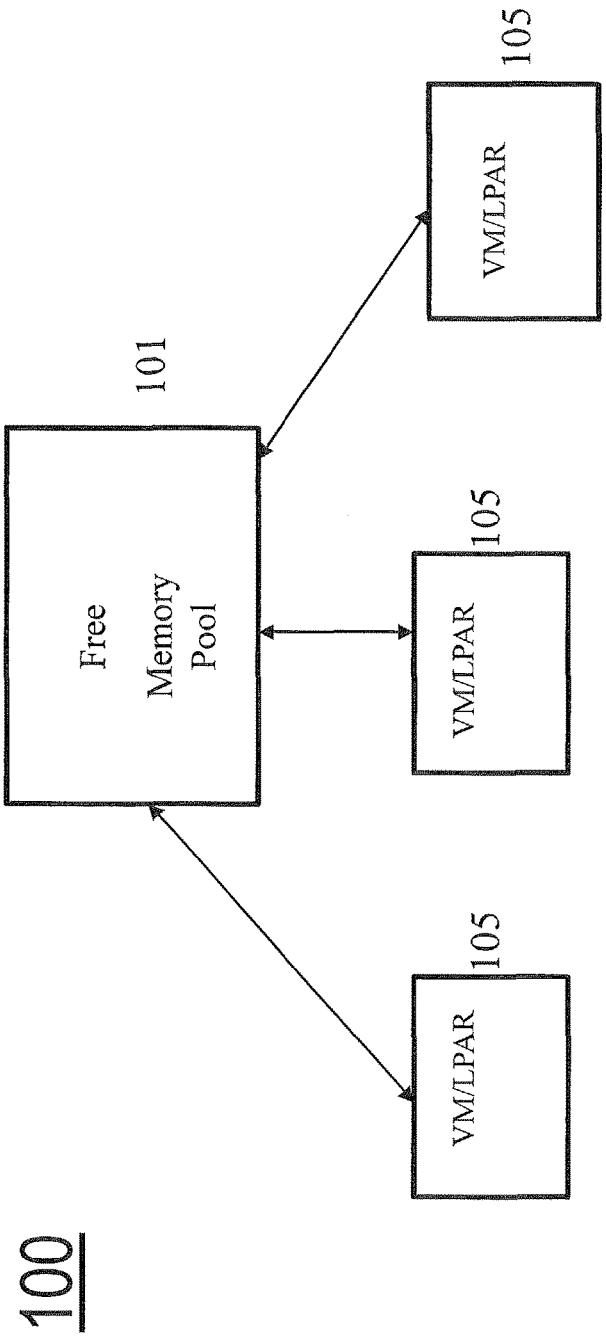
FIG. 1 depicts a memory optimization system 100 according to exemplary aspects of the present invention.

DETAILED DESCRIPTION OF EXEMPLARY
EMBODIMENTS OF THE INVENTION

Referring now to the drawings, and more particularly to FIGS. 1-6, there are shown exemplary embodiments of the method and structures according to the present invention.

In some exemplary embodiments, the present invention manages memory among one or more computing systems. A computing system may include, for example, a virtual machine (VM), or a logical partition (LPAR). A computing system may also include other entities as well, including but not limited to entities operating under the control of an operating system. These examples are not in any way limiting.

In an exemplary embodiment, memory is managed among multiple LPARs. Each LPAR can be thought of as a virtual machine (VM). A key advantage of an exemplary approach of the present invention is that memory is automatically moved between different LPARs. Previous approaches do not do this. The present invention can be implemented on multiprocessor systems using IBM's dynamic logical partitioning (dLPAR) technology which runs on the AIX operating system. Further, the present invention can be implemented on various other computer systems as well.

It is possible for an LPAR to include one or more virtual machines. For example, an LPAR can include multiple Java virtual machines.

AIX provides an interface to move memory between different LPARs. A key difficulty in using this interface is that users must manually invoke a function to move memory between different LPARs. It is difficult to determine when a memory move is required and if so, how much memory to move. If there are multiple LPARs, it is difficult to determine which LPARs should give up memory, and which LPAR should receive memory.

Moving memory in an optimal way is very difficult to do correctly. The user is likely to make poor decisions in determining how to move memory. Therefore, there is a need for a tool which automatically determines how to move memory between different nodes to optimize performance.

An exemplary aspect of the present invention provides an approach to automatically move memory among different LPARs. One important scenario under which the present invention can be used is cloud computing environments, for example. Cloud computing can be implemented using virtualization in which different VMs run in different LPARs. According to an exemplary aspect of the present invention, memory usage can be considerably improved. As a result, for applications which are limited by their significant use of memory, more instances of the application can run on the same hardware platform.

The present invention is designed to handle at least the following complications and problems:

It may take a considerable amount of time to move memory between different nodes. Ideally, memory moves should take place quickly. In some cases, they may require over a minute of time.

When a system call is made to move memory, the memory optimizer will not always know how much of the memory will actually be successfully moved.

The memory optimizer is not always notified after a memory move has been completed.

Further, other processes besides the memory optimizer may be moving memory between nodes as well. The memory optimizer may not be in communication with any of these other processes.

An exemplary embodiment of the present invention consists of multiple LPARS. While the present invention is discussed in terms of IBM's AIX systems, the invention can be applied to other systems which share memory among multiple nodes as well. Memory is distributed across multiple LPARs. There are at least two key components to the present invention. A first exemplary component is a monitoring component which periodically monitors each LPAR for memory statistics and CPU statistics. The pool of memory is known as the free memory pool.

The second component is a memory rebalancer which distributes memory equitably among LPARs and the free memory pool. When an LPAR is running low on memory, the memory rebalancer requests additional memory for the LPAR from the free memory pool. When the free memory pool is running low on memory, the memory rebalancer requests memory from one or more LPARs with sufficient free memory for the free memory pool. Running low on memory may generally be thought of as the amount of memory being below a minimum allowable amount of memory.

IBM's AIX operating system provides the capability for moving memory between different LPARs. This could be used with the present invention. Alternatively, various other techniques such as ballooning could be used for moving memory between LPARs/VMs. A description of exemplary ballooning techniques may be found, for example, in the VMware® "White Paper" publication "Understanding Memory Resource Management in VMware® ESX™ Server," which may be incorporated herein by reference.

For monitoring, standard monitoring features provided by commonly used operating systems such as AIX, Linux, other versions of Unix, versions of Windows, others, etc. could be used.

The memory rebalancer may be invoked at periodic intervals. For example, it might be invoked every 5 seconds; in some cases, the time interval between successive invocations of the memory rebalancer is variable.

It is very desirable to limit paging as much as possible, as paging can seriously hurt performance. Paging would occur when the memory requirements for an LPAR/VM exceed the physical memory assigned to the LPAR/VM. In order to continue executing in this situation, the LPAR/VM might have to send some memory to disk.

FIG. 1 depicts a memory optimization system 100 according to an exemplary embodiment of the present invention. In the system, a free memory pool 101 can provide memory to a plurality of VMs/LPARS 105. The system can make sure that the free memory pool 101 and all VMs/LPARS 105 have sufficient memory. Further, the system can preemptively move memory to prevent paging. Additionally, the system may limit movement of memory for stability, thus reducing overhead of moves. The VMs/LPARs are not limited to any specific number, so that the three VMs/LPARs shown in the figure are simply one of many possibilities within the spirit and scope of this invention. A monitor can monitor a memory amount of the VMs/LPARs 105 and the free memory pool 101. A memory rebalancer can balance memory amounts between the various VMs/LPARs 105 themselves, and between the VMs/LPARS 105 and the free memory pool 101.

Figure 7:
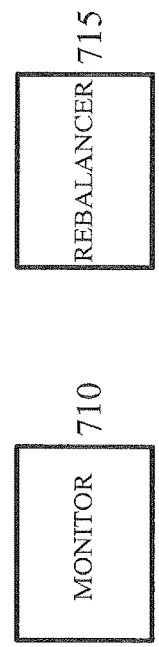
FIG. 7 depicts a memory optimization system 700 according to exemplary aspects of the present invention

FIG. 7 depicts an exemplary memory optimization system 700 according to an exemplary embodiment. The system 700 includes a memory rebalancer 715 and a monitor 710. Techniques used by the memory rebalancer 715 to optimize memory usage among VMs/LPARs as well as a free memory pool are described in detail throughout this patent application.

In at least one exemplary embodiment, the memory system 700 may be used to allocate memory among a plurality of computing systems.

Each computing system may have an assigned free memory threshold, and at least one of the free memory thresholds may be dynamically varied based on a past memory usage. The monitor 710 can periodically monitor each computing system for memory usage. If the monitor determines that an amount of free memory for a computing system is below the free memory threshold for the computing system, the memory rebalance 715 can allocate memory from a free memory pool to the computing system.

In an another exemplary embodiment, at least one free memory threshold assigned to a computing system may be determined so that one or more of a probability of the computing system achieving paging does not exceed a threshold and a probability of the plurality of computing systems achieving paging, does not exceed a threshold.

In yet another exemplary embodiment, if the monitor 710 determines that a computing system is running low on free memory, a determination can be made to see if a memory size of the computing system has recently increased. If the monitor 710 determines that the memory size of the computing system has not recently increased or determines that the memory size of the computing system has increased at a rate falling below a threshold, the memory rebalancer 715 can allocate memory from a free memory pool to the computing system.

In another exemplary embodiment, the monitor 710 can periodically monitor the free memory pool for memory usage. The free memory pool may have an assigned size threshold, and the size threshold may be dynamically varied based on one or more requests to the free memory pool for memory.

In another exemplary embodiment, a free memory pool size threshold may be determined so that a probability of the free memory pool running out of memory does not exceed a threshold. If the monitor 710 determines that a size of the free memory pool is below the free memory pool size threshold, at least one computing system with sufficient free memory is identified. Memory from the at least one computing system can transferred to the free memory pool.

In again another exemplary embodiment, the monitor 710 can determine that the free memory pool is running low on free memory and determine if a size of the free memory pool has recently increased. If the monitor 710 determines that that the size of the free memory pool has not recently increased or determines that the size of the free memory pool has increased at a rate falling below a threshold, at least one computing system with sufficient free memory is identified. Memory from the at least one computing system can transferred to the free memory pool.

It is noted that the above discussed embodiments are only exemplary, and that two or more of the embodiments may be combined as appropriate.

Figure 2:
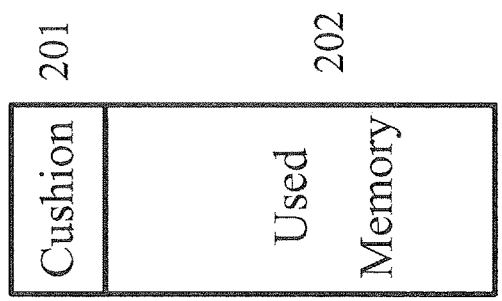
FIG. 2 depicts an LPAR memory 200 according to exemplary aspects of the present invention.

FIG. 2 provides a detailed view of an exemplary LPAR memory 200 according to an exemplary embodiment of the present invention. Each LPAR has a memory cushion 201 which is extra free memory. The purpose of the memory cushions 201 is to allow an LPAR to increase its memory usage without causing paging. Each memory cushion 201 has a minimum size (hereinafter this minimum size will subsequently be referred to as the minimum memory cushion size or free memory threshold). When the memory cushion falls below the minimum size, the memory rebalancer 715 tries to give more memory to the LPAR from the free memory pool 101. When the free memory pool 101 is too small, the memory rebalancer 715 tries to take memory from a memory cushion 201 with a lot of free memory and give it to the free memory pool 101. The memory cushion (free memory) allows used memory 202 to grow without paging. The size of the memory cushion can be dynamically adjusted.

Memory moves can be unreliable. Therefore, if a command is issued to move memory from the free memory pool to an LPAR (denoted, for example, in this and other paragraphs by "LPAR1"), the memory move might not successfully execute. Therefore, memory sizes are continuously monitored to figure out what is going on. If, after a certain amount of time after requesting the memory move, the memory rebalancer 715 does not see that the size of LPAR1 increase, it may issue a second command to move memory from the free memory pool to LPAR1.

There are several potential ways in which the minimum memory cushion sizes can be determined. In general, minimum memory cushion sizes are customized to specific LPARs. Memory usage of LPARs is monitored over time. Based on the memory usage pattern for an LPAR, the minimum memory cushion size is determined. If an LPAR has relatively constant memory requirements, then a small minimum memory cushion size is used. If, on the other hand, there are sudden spikes in memory demand, then a larger minimum memory cushion size is used.

In general, memory cushion sizes can be customized to workloads running on an LPAR.

There are multiple possible methods for assigning minimum memory cushion sizes, including, but not limited to, the following:

Have a default memory cushion size (e.g., 2 gigabytes)

Try to ensure that the paging probability per unit time for LPAR i is less than or equal to pi, for some threshold probability pi. In the simplest case, the same threshold probability is used for each LPAR. In a more complicated scenario, pi might be correlated with a parameter such as the service class of an LPAR. An LPAR i belonging to a high service class might have a very low value of pi. An LPAR j belonging to a lower service class might have a higher threshold paging probability pj.

Try to ensure that the paging probability per unit time across the entire system is less than or equal to p1 for some threshold probability p1.

Monitoring data from past behavior can be used to estimate probabilities. Based on past behavior on how fast the memory demands for an LPAR/VM can grow, the present invention can estimate the probability of paging occurring for a particular memory cushion size. If past behavior indicates that memory requirements can grow very suddenly, the estimated probability of paging occurring for a particular memory cushion size might be substantial. On the other hand, if past behavior indicates that memory requirements grow very slowly, then the probability of paging for the same memory cushion size would generally be lower.

These probabilities are also dependent on how quickly the system can increase a memory cushion size. If the system can move memory very quickly, then the probability of paging is lower, and smaller memory cushion sizes can be used.

Since workloads are dynamic and can change over time, more recent behavior could be weighted more heavily than less recent behavior in trying to predict future behavior.

Minimum memory cushion sizes can be dynamically modified to accommodate changing workloads. This is illustrated in step 404 of FIG. 4.

A key feature of a memory optimization system according to an exemplary embodiment of the present invention is that such a system maintains a global view of all VMs/LPARs. That way, it can make globally optimal decisions in how to allocate memory across the LPARs/VMs as well as the free memory pool 101.

Exemplary embodiments of the present invention attempt to minimize paging across LPARs (VMs). Ideally, all paging will be avoided, since once an LPAR/VM starts paging information to disk, performance is substantially degraded. It is thus desirable to avoid paging as much as possible.

The free memory pool 101 is used to provide LPARs running low on memory with more memory. The free memory pool can also be used to provide memory to newly activated LPARs/VMs. When an LPAR/VM has finished executing, it is desirable to return memory from the LPAR/VM to the free memory pool.

When the free memory pool is too small, it is desirable to return memory from one or more LPARs to the free memory pool. For example, there could be a free memory pool size threshold. When the free memory pool size falls below the free memory pool size threshold, the memory rebalancer can try to obtain more memory for the free memory pool from one or more LPARs which have extra space in their memory cushions.

The free memory pool threshold size can be selected, for example, so that the probability of the free memory pool running out of memory per unit time falls below a threshold.

Monitoring data from past behavior can be used to estimate probabilities. Based on past behavior on memory demands to the free memory pool, the system can estimate the probability of the free memory pool running out of memory. If past behavior indicates that multiple large requests for memory from the free memory pool can occur in a very short period of time, the estimated probability of the free memory pool running out of memory for a particular free memory pool size may be high. On the other hand, if past behavior indicates that there are few requests for memory from the free memory pool and these requests are almost always small, then the probability of the free memory pool running out of memory for a particular free memory pool size would generally be lower.

These probabilities are also dependent on how quickly the system can add memory to the free memory pool. If the system can move memory very quickly to the free memory pool, then the probability of the free memory pool running out of memory is lower, and smaller free memory pool sizes can be used.

Since workloads are dynamic and can change over time, more recent behavior could be weighted more heavily than less recent behavior in trying to predict future behavior. Indeed, monitoring data from past behavior can be used to estimate probabilities.

The free memory pool threshold size can be dynamically adjustable based on the characteristics of the workloads executing on the system. For example, if there are many demands to request substantial amounts of memory from the free memory pool, then it would be good to have a high free memory pool size threshold. If there are few demands for large amounts of memory from the free memory pool, then the free memory pool threshold size can be lower. If the memory demands on the free memory pool change over time (which could result from changes in the workloads executing on one or more LPARs/VMs; it can also result if a new LPAR/VM starts executing, or an existing LPAR/VM stops executing), then the free memory pool threshold size can be adjusted to accommodate the changing memory demands.

There are situations in which moving memory from an LPAR to the free memory pool can be very slow. While this is happening, this can prevent other memory moves from taking place on some implementations. One way to mitigate this problem is to limit the size of memory moves to the free memory pool. For example, multiple small (small can be defined in multiple ways, including, but not limited to, a block not exceeding a size threshold) blocks of memory can be moved instead of a single large block. This can prevent other memory moves from being put on hold for a long period of time, which might happen if a very large block is moved from an LPAR to a free memory pool.

Figure 3:
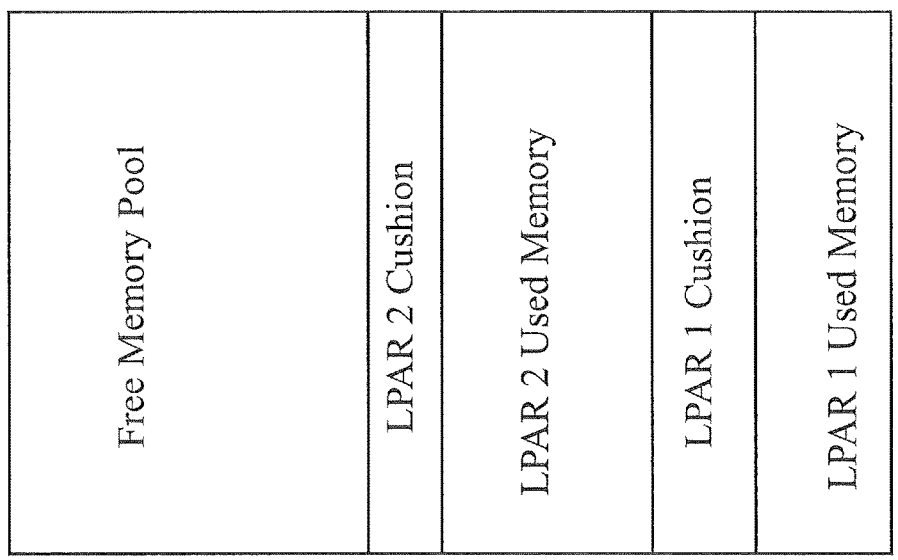
FIG. 3 depicts a memory layout 300 according to an exemplary embodiment of the present invention.

FIG. 3 provides a detailed look at an exemplary memory layout 300 according to an exemplary embodiment of the present invention. In the memory layout 300, a free memory pool 301 (which can be synonymous with the free memory pool 101) is shown. Further, the memory layout 300 depicts a first LPAR (LPAR 1) which may include a memory cushion 312 and a used memory portion 311. The memory layout 300 also shows a second LPAR (LPAR 2) which may include a memory cushion 322 and a used memory portion 321. The free memory pool 301 may feed memory to the LPARs 1 and 2, and vice versa. The memory layout may be an exemplary layout of a memory included in any of the other figures, and any of the methods and systems described in the present disclosure. The memory layout is only intended to be exemplary and is not, in any way, limiting. Other memory layouts can also be used within the spirit and scope of this invention.

As mentioned, memory moves can be unreliable. Therefore, if a command to move memory from LPAR 1 to the free memory pool is issued, it might not successfully execute. Therefore, the memory rebalancer continuously monitors memory sizes to figure out what is going on. If after a certain amount of time after requesting the memory move, the memory rebalancer does not see the size of LPAR1 decrease, it may issue a second command to move memory from LPAR 1 to the free memory pool. In one or both cases, the request to move memory may be for a small block, such as one not exceeding a size threshold.

Moving memory between LPARs and the free memory pool can also involve considerable overhead. It is often desirable to limit the number of these moves. For example, if one or more LPARs have extra space in their memory cushions, it would be possible to give this extra space to the free memory pool. However, if the free memory pool already has enough space, then the memory rebalancer will preferably not return the excess memory to the free memory pool at the current time. Such a memory move would incur overhead, and the LPARs might eventually need their extra memory cushion. If, at some later stage, the free memory pool actually needs more memory and an LPAR has extra memory cushion space, memory from the LPAR can be moved to the free memory pool at that particular time.

A memory cushion may have a high size threshold. Once the size of the memory cushion exceeds the high size threshold, memory can be given from the memory cushion to the free memory pool when the free memory pool needs more memory. High size thresholds can be adjusted dynamically in response to changing run-time memory requirements.

When more than one LPAR has excess memory to give back to the free memory pool, there are multiple ways this can be done, including, but not limited to, the following:

Equalize the amount by which an LPAR size exceeds its high size threshold across different LPARs. For example, memory moves could be made with the intention of making the difference between the memory size of an LPAR and its high size threshold roughly equivalent across different LPARs.

Equalize the proportion by which an LPAR size exceeds its high size threshold. For example, memory moves could be made with the intention of making the ratio (memory size of an LPAR—high size threshold of the LPAR)/(memory size of the LPAR) roughly equivalent across different LPARs.

Additional features of the invention exist to deal with the fact that memory moves to and from LPARs might be slow and/or unreliable. In other words, if the memory rebalancer issues a command to move two gigabytes of memory from an LPAR to the free memory pool 101, there is no guarantee that this move will fully succeed. In addition, the memory move might be slow and/or might be interrupted (i.e. not continuous).

In order to handle situations such as this, the memory rebalancer can constantly monitor the memory state of the system to determine how to move memory between LPARs and the free memory pool. Suppose the memory rebalancer determines that LPAR 1 has a memory cushion which is too small. The memory rebalancer might look at recent data from LPAR 1 to indicate if LPAR 1 is growing due to memory being added to it from the free memory pool. If the memory cushion is too small but the memory rebalancer determines from recent monitoring data that the memory allocated to LPAR 1 is growing, then the memory rebalancer does not have to issue a request to obtain more memory for LPAR 1 from the free memory pool. Instead, the memory rebalancer can wait until LPAR 1 stops growing in size Alternatively, the memory rebalancer can wait until LPAR 1 either stops growing in size or is growing at a slow rate. For example, the memory rebalancer can wait until the rate at which LPAR 1 is growing falls below a threshold. At that point, it can determine if the memory cushion for LPAR 1 is too small. If so, then it will issue a request to obtain more memory for LPAR 1 from the free memory pool. If not, then the memory rebalancer does not have to issue a request to obtain more memory for LPAR1 at the current time.

If the memory cushion for LPAR 1 is too small and LPAR 1 is not growing (i.e. it has stayed the same size based on recent monitoring data or has decreased in size), then the memory rebalancer will try to obtain more memory for LPAR 1 from the free memory pool.

Alternatively, if the memory cushion for LPAR 1 is too small and LPAR 1 is growing very slowly (for example, the rate of growth of LPAR 1 is below a threshold), then the memory rebalancer can also try to obtain more memory for LPAR 1 from the free memory pool.

In some cases, the free memory pool might be low on memory. In this case, it is desirable to return memory to the free memory pool from an LPAR with has extra memory in its memory cushion. Suppose that LPAR 1 has extra memory in its memory cushion which could be given back to the free memory pool. Before the memory rebalancer decides to give memory from LPAR 1 to the free memory pool, it may be advisable to look at data from recent sizes of LPAR 1. If the data indicates that LPAR 1 is shrinking in size (e.g. some memory from LPAR 1 is already being transferred to the free memory pool from a previous request), then the memory rebalancer might wait until LPAR 1 has stopped shrinking in size (or is shrinking at a slow rate. For example, the memory rebalancer can wait until the rate at which LPAR 1 is shrinking falls below a threshold) before issuing a request to move memory from LPAR 1 to the free memory pool. If, after LPAR 1 has stopped shrinking in size (or is shrinking very slowly), LPAR 1 still has excess memory in its memory cushion and the free memory pool still needs more memory, then the memory rebalancer can issue a request to move memory from LPAR 1 to the free memory pool. On the other hand, if, after LPAR 1 has stopped shrinking in size (or is shrinking very slowly), either LPAR 1 no longer has excess memory in its memory cushion or the free memory pool no longer needs more memory, then it may be best for the memory rebalancer not to issue a request to move memory from LPAR 1 to the free memory pool at the current time.

If the free memory pool is running low on memory, the memory rebalancer tries to obtain memory from one or more LPARs with excess memory cushions to add to the free memory pool. Before the memory rebalancer decides to give memory from an LPAR to the free memory pool, it may be advisable to look at data on recent free memory pool sizes. If the data indicates that the free memory pool is increasing in size (e.g. some memory from at least one LPAR is already being transferred to the free memory pool from a previous request), then the memory rebalancer might wait until the free memory pool has stopped growing in size before trying to move more memory from an LPAR to the free memory pool. Alternatively, the memory rebalancer can wait until the free memory pool either stops growing in size or is growing at a slow rate before trying to move memory from an LPAR to the free memory pool. For example, the memory rebalancer can wait until the rate at which the free memory pool is growing falls below a threshold.

If, after the free memory pool has stopped growing in size (or is growing at a very slow rate), the free memory pool is still too small, then the memory rebalancer can try to find one or more LPARs with large enough memory cushions to give some memory to the free memory pool. On the other hand, if, after the free memory pool has stopped expanding in size (or is expanding in size at a very slow rate), the free memory pool is large enough, then it may be best for the memory rebalancer not to try to move more memory from an LPAR to the free memory pool at the current time.

Exemplary embodiments of the present invention provide the ability to combine queued memory move requests corresponding to the same LPAR. For example, suppose a memory request r1 to move 512 mbytes of memory to LPAR 1 from the free memory pool is queued up in the system. Before r1 can be processed, a request r2 to move 256 mbytes of memory to LPAR 1 from the free memory pool is received. The system has the ability to combine r1 and r2 into a single request r3 to move 768 mbytes of memory to LPAR 1 from the free memory pool. If, while r3 is still on the queue, another request r4 is received requesting that 512 mbytes of memory be moved to the free memory pool from LPAR 1, then r3 and r4 can be combined into a single request to move 256 mbytes of memory from the free memory pool to LPAR 1.

Figure 4:
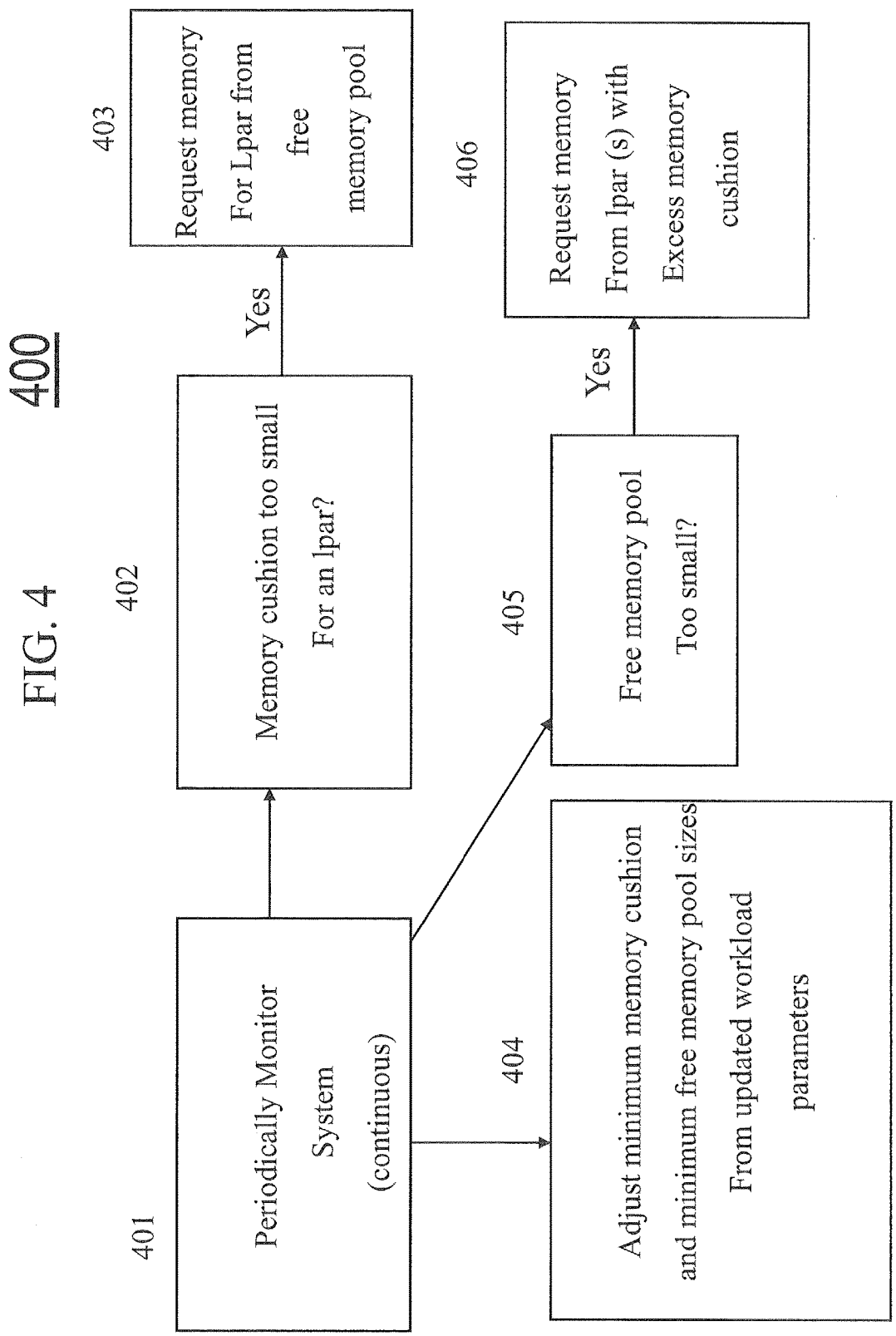
FIG. 4 depicts a method 400 for allocating memory across multiple LPARs according to exemplary aspects of the present invention.

FIG. 4 depicts a method 400 for allocating memory across multiple LPARs in accordance with an exemplary embodiment of the present invention. In step 401, the system is continuously being monitored for information such as memory usage across different LPARs and CPU usage. In step 402, the system looks at memory cushions for different LPARs. If none of the memory cushions are too small, then further action is not needed. For each LPAR which has a memory cushion which is too small, processing continues to step 403 in which more memory is requested for the LPAR from the free memory pool.

In step 405, the system looks at the free memory pool size. If it is large enough, no further action is needed. If the free memory pool is too small, processing continues to step 406 in which the system tries to find one or more LPARs with excess space in their memory cushions. If at least one LPAR with a large enough memory cushion is found, then the system tries to move at least some of the memory in the at least one LPAR to the free memory pool.

In step 404, minimum memory cushion sizes and the free memory pool size threshold are adjusted as needed based on information about the workload which has recently been monitored. High free memory pool size thresholds may also be adjusted in this step. It may be the case that analysis of the monitored data indicates that no changes (or only a few small changes) to the parameters are needed.

One variation on this approach within the spirit and scope of the invention is to not maintain a free memory pool separate from each LPAR/VM. Instead, free memory may be maintained within one or more LPAR(s)/VMs (s). When an LPAR/VM needs more memory, the memory rebalancer will try to obtain memory for the LPAR/VM from at least one other LPAR/VM which has sufficient memory to give to the original LPAR/VM.

In certain exemplary embodiments of the present invention, it is less expensive to transfer memory from a free memory pool maintained independently from the LPARs/VMs to an LPAR than to transfer memory directly between two LPARs. This is a key reason why a free memory pool is maintained separately from the LPARs/VMs comprising our executing system.

Another variation within the spirit and scope of this invention is to have a part of the free memory pool be managed independently from each computing system (i.e. VM/LPAR) as described earlier. Another part of the free memory pool would comprise part of the memory of at least one VM/LPAR. This is a hybrid model combining both of the previously mentioned models for managing the free memory pool.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. FIG. 6 shows some exemplary computer readable storage mediums 601, 602. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or system. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
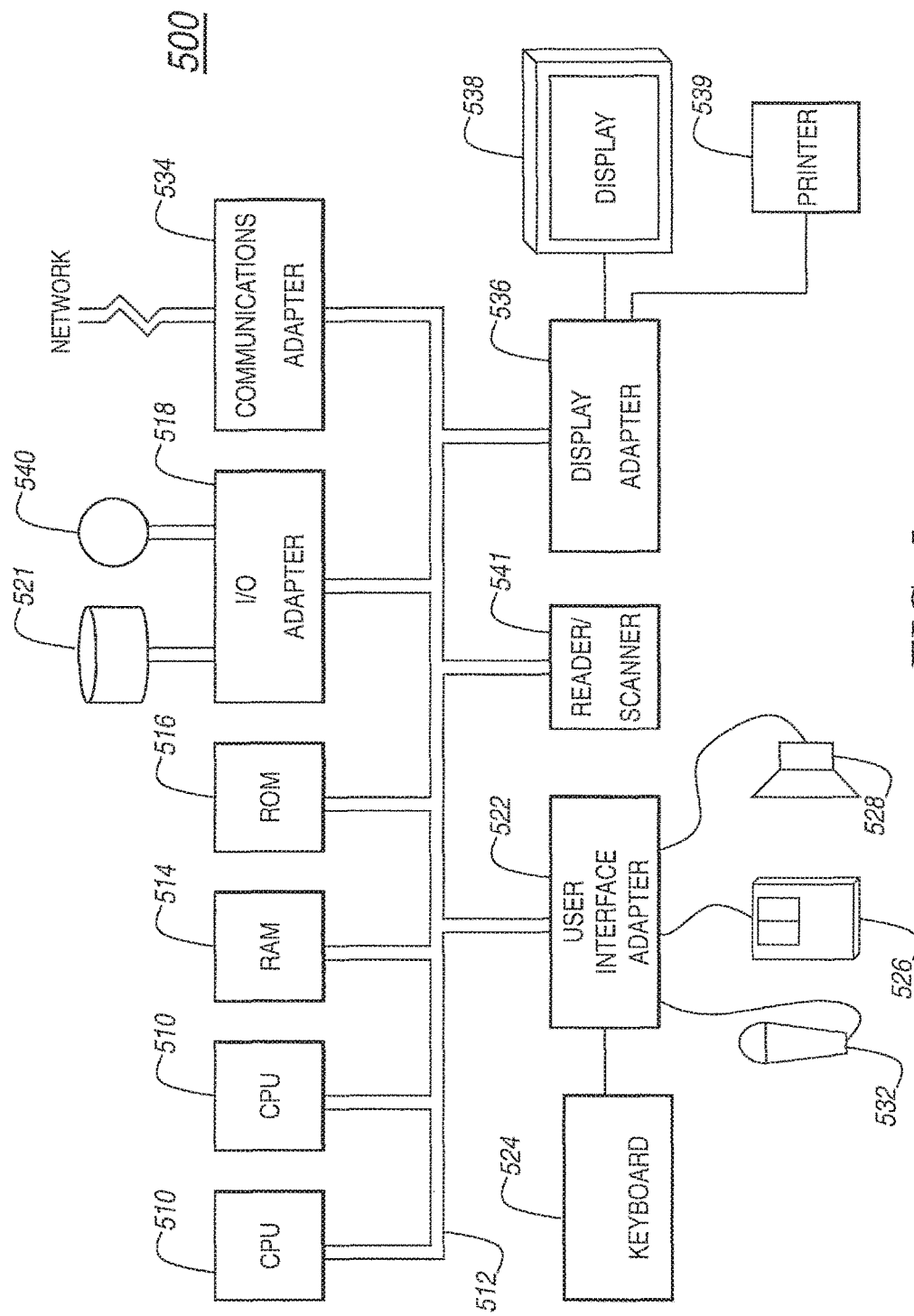
FIG. 5 is a typical hardware configuration 500 which may be used for implementing the inventive aspects of the present disclosure.

FIG. 5 shows a typical hardware configuration 500, which may be used for implementing the aforementioned inventive aspects of the present disclosure. The configuration has preferably at least one processor or central processing unit (CPU) 510. The CPUs 510 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539. Further, an automated reader/scanner 541 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method.

Such a method may be implemented, for example, by operating the CPU 510 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 510 and hardware above, to perform the method of the invention.

This non-transitory storage media may include, for example, a RAM contained within the CPU 510, as represented by the fast-access storage for example. Alternatively, the instructions may be contained in another storage media, such as a magnetic data storage diskette 600 or compact disc 602 (FIG. 6), directly or indirectly accessible by the CPU 510.

Whether contained in the computer system/CPU 510, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C++, etc.

The flowchart and block diagrams in the figures illustrate the architecture, functionality, and operation of possible implementations of systems, methods and computer program products according to various embodiments of the present invention. Iii this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method for allocating memory among a plurality of computing systems, said method comprising:

assigning a free memory threshold to each computing system;

dynamically varying at least one free memory threshold for at least one computing system based on a past memory usage of the at least one computing system;

periodically monitoring each computing system for memory usage;

in response to said monitoring determining that an amount of free memory for a computing system is below the free memory threshold for the computing system, allocating memory from a free memory pool to the computing system;

monitoring the allocating of the memory from the free memory pool to the computing system to determine if the memory from the free memory pool has been allocated to the computing system by determining whether a memory state of the computing system has increased over a period of time after a request for allocating memory from the memory pool to the computing system is sent; and in response to the memory state of the computing system not being allocated to the computing system, issuing an additional command to allocate the memory from the free memory pool to the computing system, wherein the past memory usage includes recent memory usages, with a recent memory usage weighted more heavily than a less recent memory usage.

2. The method of claim 1, further comprising:
periodically monitoring the free memory pool;
in response to determining that the free memory pool is running low on memory, identifying at least one computing system with sufficient free memory; and
transferring memory from said at least one computing system to the free memory pool.

3. The method of claim 2 in which said transferring memory comprises:
requesting an operating system to transfer an amount of memory which is less than a size threshold due to an overhead incurred for transferring memory from the at least one computing system, to the free memory pool; and
in response to one of determining that an amount of memory allocated to said at least one computing system has not decreased and determining that an amount of memory allocated to said at least one computing system has decreased at a rate falling below a threshold, requesting an operating system to transfer an amount of memory which is below said size threshold.

4. The method of claim 1 in which said plurality of computing systems includes at least one logical partition.

5. The method of claim 1 in which said plurality of computing systems includes at least one virtual machine.

6. The method of claim 1 in which at least one free memory threshold assigned to a computing system is determined so that a probability of the computing system achieving paging does not exceed a threshold.

7. The method of claim 1 in which at least one free memory threshold assigned to a computing system is determined so that a probability of the plurality of computing systems achieving paging does not exceed a threshold.

8. The method of claim 1 in which the free memory pool is managed separately from the memory of each of said computing systems.

9. The method of claim 1 in which the free memory pool is distributed among memories of said plurality of said computing systems.

10. The method of claim 1 in which part of the free memory pool is managed separately from the memory of each of said computing systems and part of the free memory pool comprises part of the memory of at least one of said computing systems.

11. A non-transitory computer-readable storage medium tangibly embodying a program of machine-readable instructions executable by a digital processing apparatus to perform the method according to claim 1.

12. A computer program product for dynamically varying memory, the computer program product comprising a computer readable storage medium having computer readable program code embodied therewith, the computer readable program code comprising:
computer readable program code configured to perform the method of claim 1.

13. A method for allocating memory among a plurality of computing systems, said method comprising:
assigning a free memory threshold to each computing system wherein at least one free memory threshold assigned to a computing system is determined so that one of a probability of the computing system achieving paging does not exceed a threshold and a probability of the plurality of computing systems achieving paging, does not exceed a threshold;
periodically monitoring each computing system for memory usage;
in response to said monitoring determining that an amount of free memory for the computing system is below the free memory threshold for the computing system, allocating memory from a free memory pool to the computing system;
in response to said periodically monitoring, determining if the memory usage is a recent memory usage, wherein said recent memory usage is weighted more heavily than a less recent memory usage;
monitoring the allocating of the memory from the free memory pool to the computing system to determine if the memory from the free memory pool has been allocated to the computing system by determining whether a memory state of the computing system has increased over a period of time after a request for allocating memory from the memory pool to the computing system is sent; and
in response to the memory state of the computing system not being allocated to the computing system, issuing an additional command to allocate the memory from the free memory pool to the computing system.

14. A method for allocating memory among a plurality of computing systems, said method comprising:
periodically monitoring each computing system for memory usage;
in response to said monitoring determining that a computing system is running low on free memory, determining if a memory size of the computing system has recently increased;
in response to one of determining that the memory size of the computing system has not recently increased and determining that the memory size of the computing system has increased at a rate falling below a threshold, allocating memory from a free memory pool to the computing system;
in response to said periodically monitoring, determining if the memory usage is a recent memory usage, wherein said recent memory usage is weighted more heavily than less recent memory usage;

monitoring the allocating of the memory from the free memory pool to the computing system to determine if the memory from the free memory pool has been allocated to the computing system by determining whether a memory state of the computing system has increased over a period of time after a request for allocating memory from the memory pool to the computing system is sent; and in response to the memory state of the computing system not being allocated to the computing system, issuing an additional command to allocate the memory from the free memory pool to the computing system.

15. The method of claim 14 further comprising:
periodically monitoring the free memory pool;
in response to determining that the free memory pool is running low on memory, identifying at least one computing system with sufficient free memory; and
transferring memory from said at least one computing system to the free memory pool.

16. The method of claim 15 in which said transferring memory comprises:
requesting an operating system to transfer an amount of memory which is below a size threshold due to an overhead incurred for transferring memory from the at least one computer system to the free memory pool; and
in response to one of determining that an amount of memory allocated to said at least one computing system has not decreased and determining that an amount of memory allocated to said at least one computing system has decreased at a rate falling below a threshold, requesting an operating system to transfer an amount of memory which is below said size threshold.

17. The method of claim 14 in which said plurality of computing systems includes at least one logical partition or at least one virtual machine.

18. The method of claim 14 in which the free memory pool is managed separately from the memory of each of said computing systems.

19. The method of claim 14 in which the free memory pool is distributed among the memories of a plurality of said computing systems.

20. The method of claim 14 in which part of the free memory pool is managed separately from the memory of each of said computing systems and part of the free memory pool comprises part of the memory of at least one of said computing systems.

21. A method for allocating memory among a plurality of computing systems, said method comprising:
assigning a free memory pool size threshold to a free memory pool, wherein memory from the free memory pool is allocated to a plurality of the computing systems;
monitoring the allocated of the memory from the free memory pool to the plurality of the computing systems to determine if the memory from the free memory pool has been allocated to the plurality of the computing systems by determining if a memory state of a computing system out of plurality of the computing systems has increased over a period of time after a request for allocating memory from the memory pool to the computing system is sent;
in response to the memory state of the computing system not being allocated to the computing system, issuing an additional command to allocate the memory from the free memory pool to the computing system;

dynamically varying the free memory pool size threshold in response to requests to the free memory pool for memory;
periodically monitoring each computing system and the free memory pool, for memory usage;
in response to determining that a size of the free memory pool is below the free memory pool size threshold, identifying at least one computing system with sufficient free memory;
transferring memory from said at least one computing system to the free memory pool; and
in response to said periodically monitoring, determining if the memory usage is a recent memory usage, wherein said recent memory usage is weighted more heavily than less recent memory usage.

22. The method of claim 21 in which said transferring memory comprises:
requesting an operating system to transfer an amount of memory which is below a size threshold due to an overhead incurred for transferring memory from the at least one computer system to the free memory pool; and
in response to one of determining that an amount of memory allocated to said at least one computing system has not decreased and determining that an amount of memory allocated to said at least one computing system has decreased at a rate falling below a threshold, requesting an operating system to transfer an amount of memory which is below said size threshold.

23. The method of claim 21 in which said plurality of computing systems includes at least one logical partition.

24. The method of claim 21 in which said plurality of computing systems includes at least one virtual machine.

25. The method of claim 21 in which said free memory pool size threshold is determined so that a probability of the free memory pool running out of memory does not exceed a threshold.

26. The method of claim 21 in which the free memory pool is managed separately from the memory of each of said computing systems.

27. The method of claim 21 in which the free memory pool is distributed among the memories of a plurality of said computing systems.

28. The method of claim 21 in which part of the free memory pool is managed separately from the memory of each of said computing systems and part of the free memory pool comprises part of the memory of at least one of said computing systems.

29. The method of claim 21 further comprising:
in response to said monitoring determining that a computing system is running low on free memory, allocating memory from the free memory pool to the computing system.

30. A method for allocating memory among a plurality of computing systems, said method comprising:
assigning a free memory pool size threshold to a free memory pool, wherein said free memory pool size threshold is determined so that a probability of the free memory pool running out of memory does not exceed a threshold;
periodically monitoring each computing system and the free memory pool for memory usage;
in response to determining that a size of the free memory pool is below the free memory pool size threshold, identifying at least one computing system with sufficient free memory;

determining if a memory state of the at least one computing system is shrinking in size;

determining if a memory state of the free memory pool is increasing in size;

transferring memory from said at least one computing system to the free memory pool after a determination that the memory state of the at least one computing system has stopped shrinking in size and a size of the memory state of the free memory pool has stopped increasing but still falls below the free memory pool size threshold; and in response to said monitoring, determining if the memory usage is a recent memory usage, wherein said recent memory usage is weighted more heavily than less recent memory usage.

31. The method of claim 30 further comprising:

in response to said monitoring determining that a computing system is running low on free memory, allocating memory from the free memory pool to the computing system.

32. A method for allocating memory among a plurality of computing systems, said method comprising:

periodically monitoring each computing system and a free memory pool for memory usage, wherein memory from the free memory pool is allocated to a plurality of the computing systems;

monitoring the allocated of the memory from the free memory pool to the plurality of the computing systems to determine if the memory from the free memory pool has been allocated to the plurality of the computing systems by determining if a memory state of a computing system out of plurality of the computing systems has increased over a period of time after a request for allocating memory from the memory pool to the computing system is sent;

in response to the memory state of the computing system not being allocated to the computing system, issuing an additional command to allocate the memory from the free memory pool to the computing system;

in response to said periodically monitoring determining that the free memory pool is running low on free memory, determining if a size of the free memory pool has recently increased;

in response to one of determining that the size of the free memory pool has not recently increased and determining that the size of the free memory pool has increased at a rate falling below a threshold identifying at least one computing system with sufficient free memory;

determining if a memory state of the at least one computing system is shrinking size;

determining if a memory state of the free memory pool is increasing in size;

transferring memory from said at least one computing system to the free memory pool after a determination that the memory state of the at least one computing system has stopped shrinking in size and a size of the memory state of the free memory pool has stopped increasing but still falls below the free memory pool size threshold; and in response to said periodically monitoring, determining if the memory usage is a recent memory usage, wherein said recent memory usage is weighted more heavily than less recent memory usage.

33. The method of claim 32 in which said transferring memory comprises:

requesting an operating system to transfer an amount of memory which is below a size threshold due to an overhead incurred for transferring memory from the at least one computer system to the free memory pool; and in response to one of determining that an amount of memory allocated to said at least one computing system has not decreased and determining that an amount of memory allocated to said at least one computing system has decreased at a rate falling below a threshold, requesting an operating system to transfer an amount of memory which is below said size threshold.

34. The method of claim 32 in which said plurality of computing systems includes at least one logical partition.

35. The method of claim 32 in which said plurality of computing systems includes at least one virtual machine.

36. The method of claim 32 in which the free memory pool is managed separately from the memory of each of said computing systems.

37. The method of claim 32 in which the free memory pool is distributed among the memories of a plurality of said computing systems.

38. The method of claim 32 in which part of the free memory pool is managed separately from the memory of each of said computing systems and part of the free memory pool comprises part of the memory of at least one of said computing systems.

39. The method of claim 32 further comprising:

in response to said monitoring determining that a computing system is running low on free memory, allocating memory from the free memory pool to the computing system.

* * * * *